United States Patent
Huomo

(10) Patent No.: US 9,385,588 B2
(45) Date of Patent: Jul. 5, 2016

(54) REACTIVE POWER MANAGEMENT

(71) Applicant: Reactive Technologies Finland OY, Oulu (FI)

(72) Inventor: Heikki Huomo, Oulu (FI)

(73) Assignee: Reactive Technologies Finland OY, Oulu (FI)

( * ) Notice: Subject to any disclaimer, the term of this patent is extended or adjusted under 35 U.S.C. 154(b) by 0 days.

(21) Appl. No.: 14/265,879

(22) Filed: Apr. 30, 2014

(65) Prior Publication Data

US 2014/0232357 A1    Aug. 21, 2014

Related U.S. Application Data

(63) Continuation of application No. 12/861,234, filed on Aug. 23, 2010, now Pat. No. 8,749,207.

(30) Foreign Application Priority Data

May 25, 2010  (GB) .................................. 1008685.8
Aug. 20, 2010  (GB) .................................. 1013987.1

(51) Int. Cl.
   *H02J 3/18*   (2006.01)
   *H02M 1/42*   (2007.01)
   *H02M 7/5387*  (2007.01)

(52) U.S. Cl.
   CPC ........... *H02M 1/4208* (2013.01); *H02J 3/1892* (2013.01); *Y02P 80/11* (2015.11)

(58) Field of Classification Search
   CPC ..... Y02E 40/30; Y02E 40/34; H02M 7/5387; H02J 3/18
   USPC .......... 323/205, 207, 909; 363/39, 40, 95, 97, 363/98, 131, 132
   See application file for complete search history.

(56) References Cited

U.S. PATENT DOCUMENTS 4,052,648 A   10/1977 Nola
4,355,274 A   10/1982 Bourbeau
(Continued)

FOREIGN PATENT DOCUMENTS

CN   101350528 A   1/2009
CN   101677184 A   3/2010
(Continued)

OTHER PUBLICATIONS

International Search Report and Written Opinion dated Feb. 8, 2012 in corresponding PCT Application No. PCT/EP2011/058510 (10 pages).

(Continued)

*Primary Examiner* — Gary L Laxton
(74) *Attorney, Agent, or Firm* — EIP US LLP

(57) ABSTRACT

Methods and systems for controlling a reactive power contribution to reactive power flowing in an electricity distribution network, so as to optimize this reactive power flow are described. A reactive power characteristic of electrical power flowing in the electricity distribution network is detected at a power device. The reactive power characteristic relates to a reactive power component of electricity flowing in the network. On the basis of the detected reactive power characteristic a reactive power contribution to the electricity distribution network is controlled so as to adjust a value of the detected reactive power characteristic. This enables individual power consumption and/or provision devices to react autonomously to local variations in the electricity distribution network, and to provide a reactive power contribution, to drive the detected reactive power characteristic towards a desired value.

22 Claims, 8 Drawing Sheets

(56) References Cited

U.S. PATENT DOCUMENTS

| | | | |
|---|---|---|---|
| 4,356,440 A * | 10/1982 | Curtiss et al. | 323/210 |
| 5,041,959 A * | 8/1991 | Walker | 363/79 |
| 5,043,857 A | 8/1991 | Kirchberg et al. | |
| 5,225,712 A * | 7/1993 | Erdman | 290/44 |
| 5,255,176 A | 10/1993 | Hatta et al. | |
| 5,369,353 A | 11/1994 | Erdman | |
| 5,666,275 A * | 9/1997 | Inokuchi et al. | 363/35 |
| 5,809,054 A | 9/1998 | Oelscher | |
| 7,280,377 B2 | 10/2007 | Johnson | |
| 7,844,370 B2 | 11/2010 | Pollack et al. | |
| 7,872,441 B2 | 1/2011 | Gallegos-Lopez et al. | |
| 8,008,793 B2 | 8/2011 | Andresen | |
| 8,068,352 B2 | 11/2011 | Yu et al. | |
| 8,749,207 B2 * | 6/2014 | Huomo | 323/207 |
| 2006/0044850 A1 | 3/2006 | Wu et al. | |
| 2009/0200994 A1 | 8/2009 | Fornage | |
| 2010/0067271 A1 | 3/2010 | Garces et al. | |

FOREIGN PATENT DOCUMENTS

| | | | |
|---|---|---|---|
| GB | 2085204 | A | 4/1982 |
| JP | 61156320 | A2 | 7/1986 |
| JP | 6343530 | A2 | 2/1988 |
| JP | 09163605 | A2 | 6/1997 |
| JP | 11289668 | A2 | 10/1999 |
| JP | 2000232736 | A2 | 8/2000 |
| JP | 2000358329 | A2 | 12/2000 |
| JP | 2002300726 | A2 | 10/2002 |
| JP | 2009254166 | A2 | 10/2009 |
| JP | 2009254167 | A2 | 10/2009 |
| WO | 9311604 | A1 | 6/1993 |
| WO | WO 02/29962 | A2 | 4/2002 |
| WO | WO 2007/143570 | A2 | 12/2007 |
| WO | 2008012680 | A2 | 10/2008 |
| WO | 2011147852 | A2 | 12/2011 |

OTHER PUBLICATIONS

U.K. Intellectual Property Office Search Report dated Jul. 2, 2010 issued in connection with a related UK Application No. GB1008685.8 (5 pages).

Examination Report under Section 18(3) issued Sep. 4, 2012 in related UK Application No. GB1008685.8 (3 pages).

* cited by examiner

REACTIVE POWER MANAGEMENT

CROSS-REFERENCE TO RELATED APPLICATIONS

The present application is a continuation of U.S. application Ser. No. 12/861,234 filed Aug. 23, 2010 entitled REACTIVE POWER MANAGEMENT, which application claims priority under 35 USC 119 of UK Patent Application GB 1008685.8 filed May 25, 2010 and UK Patent Application GB 1013987.1 filed Aug. 20, 2010, the entire disclosures of each of which are incorporated herein by reference.

FIELD OF THE INVENTION

The present invention relates to management of reactive power flow in an electricity distribution network. In particular, but not exclusively, it relates to devices and methods for controlling reactive power flow at power consumption and/or provision devices.

BACKGROUND OF THE INVENTION

Supply of electricity from providers such as power stations, to consumers, such as domestic households and businesses, typically takes place via an electricity distribution network. FIG. 1 shows an exemplary electricity distribution network 1 comprising an electricity transmission grid 100 and an electricity distribution grid 102. The transmission grid is connected to generating plants 104, which may be nuclear plants or gas-fired plants, for example, from which it transmits large quantities of electrical energy at very high voltages (in the UK, for example, this is typically of the order of 204 kV; however this varies by country), using power lines such as overhead power lines, to the distribution grid 102. The transmission grid 100 is linked to the distribution grid 102 via a transformer node 106, which includes a transformer 106 which converts the electric supply to a lower voltage (in the UK, for example, this is typically of the order of 50 kV; however, this varies by country) for distribution in the distribution grid 102. The distribution grid in turn links, via substations 108 comprising further transformers for converting to still lower voltages, to local networks such as a city network 112 supplying domestic users 114, and to industrial consumers such as a factory 110. Smaller power providers such as wind farms 116 may also be connected to the distribution grid 102, and provide power thereto. Electric power is typically transmitted through all parts of the electricity distribution network in the form of a sinusoidal alternating current (AC) wave.

Electric power consuming devices connected to the network at, for example, the site of a domestic user 114, act as a load on the network, drawing power therefrom. The load provided by each such device is typically not purely resistive, but includes a reactive element, due to capacitive and/or inductive elements in the devices. The reactive component of the load may be particularly large in devices such as electric motors and transformers, which have a high inductance, and devices which have a high capacitance. Such devices produce a reactive current component which flows at ±90° to the voltage; this results in a phase shift in the current flowing in the network with respect to the voltage.

The term "reactive power" is used herein to refer to the product of a reactive current component and the voltage flowing at a given location of the network. This reactive power results in no net energy transfer to the device, but it does have an effect on the network and on power suppliers, as described below. The term "real power" is used herein to refer to the rate of electrical energy consumption by a power consuming device. The term "power factor" is used herein to refer to the ratio of real power to the vector sum of the real power and reactive power.

Whilst the effect of the reactive load of an individual device on the current-voltage phase difference in the network may be small, the cumulative effect from multiple devices can be significant. The larger the current-voltage phase difference becomes, the greater the size of the current that must be supplied to a device in order to supply a given real current (i.e. the current component flowing in phase with network voltage), and therefore a given amount of real power. Further, energy losses in the network, due to e.g. heating of electric power lines, depend on the total current flow, irrespective of whether the current flow is real or reactive. Accordingly, such phase differences effectively increase the size of the total current that must be generated and supplied by a power provider in order to meet the demands of its customers; this places an economic burden on the power supplier, increasing the cost of electrical power generation. Similarly, the amount or resources consumed by the power provider in order to supply a given amount of power to a consumer is increased, which may have undesirable environmental consequences.

Further, network elements such as transformers and power lines are dimensioned according to total the size of the current (whether real or reactive) flowing in the network; their operation is therefore adversely effected by any reactive current flow (due to thermal losses and so on).

Conventionally, efforts to reduce the current-voltage phase difference of power flowing in such networks have focussed on minimising the reactive power contribution of, and/or creating an appropriate amount of compensating reactive power at, large scale power suppliers, and creating compensation for reactive power at transformer stations within the electricity distribution network. For example, a power station may use banks of capacitors and/or inductors, independently or under instructions from the network operator, to adjust the reactive power contribution of the power station. However, reactive power compensation is effective only at short distances (due to e.g. thermal losses), and, furthermore, the current-voltage phase difference may vary significantly from location to location within the electricity distribution network; this means that reactive power compensation at a small number of large scale power providers does not effectively compensate for localised current-voltage phase differences.

Some large scale consumers of reactive power may also use some means of minimising their own reactive power contribution to the network by using supplementary devices to compensate for the reactive power they generate, such as switched capacitors or an unloaded synchronous motor; indeed, some power providers encourage industrial consumers (such as factories) to contribute less reactive power by charging for reactive power contributions in addition to real power consumption. These methods all focus on minimising the contribution of individual devices to a current-voltage phase difference in the network.

United States Patent Application US2009/0200994 describes a distributed system of renewable energy sources each including circuitry for generating reactive power on demand. Each of the renewable energy sources is in communication with a central controlling "Network Operations Centre", which remotely controls reactive power production by renewable energy sources. The Network Operations Centre receives a request from a utility company (i.e. a power provider) for a required amount of reactive power; in response the Network Operations Centre calculates an optimum reactive power contribution required from each of the renewable energy sources under its control to produce the necessary compensation, and sends commands to the renewable energy sources accordingly. This provides a method of actively compensating for current-voltage phase differences that may be present in the network. However, the system of US20090200994 requires central control and cannot react to more localised changes in local network voltage-current phase differences.

It is an object of the present invention to at least mitigate some of the problems of the prior art.

SUMMARY OF THE INVENTION

In accordance with a first aspect of the invention, there is provided a reactive power control device for use with a power device, the power device being for consuming power from, or providing power to, an electricity distribution network when connected thereto, the reactive power control device comprising:

detecting means for detecting, at the power device, a reactive power characteristic of electrical power flowing in the electric power distribution network, the reactive power characteristic relating to a reactive power component of electricity flowing in the electricity distribution network; and control means arranged, to control, on the basis of the detected reactive power characteristic, a reactive power contribution to the electricity distribution network by the power device, so as to adjust a value of the detected reactive power characteristic.

By controlling provision of reactive power at a power device on the basis of a reactive power characteristic measurement made at the power device, real-time compensation can be provided for local variations in reactive power. The reactive power control device enables compensation for these local variations through autonomous variation of a reactive power contribution based on local measurement, and do not require central control.

In preferred embodiments, the reactive power control device is arranged to determine a value of the detected reactive power characteristic and compare the determined value with a predefined value, and the control means is arranged to control the reactive power contribution so as to reduce a difference between the detected value and the predetermined value.

Thus, the reactive power control device can be arranged to control a power device to produce a reactive power contribution which drives the reactive power of electricity in the electricity distribution network towards a predetermined optimum value.

The reactive power characteristic may relate to a phase difference between voltage and current of electricity flowing in the electricity distribution network; the predefined value may comprise a predefined phase difference value.

Preferably, the reactive power compensation device is arranged to determine, based on the detected reactive power characteristic, whether the reactive power component is more inductive than the predefined value or whether it is more capacitive than the predefined value, and the control means is arranged to:

control the power device to contribute capacitive reactive power to the electricity distribution network in response to a determination that the detected reactive power component is more inductive than the predefined value; and control the power device to contribute inductive reactive power to the electricity distribution network in response to a determination that the detected reactive power component is more capacitive than the predefined value.

Thus, the reactive power compensation device may control the power device to compensate for either inductive or capacitive power flows in the electricity distribution network.

In some embodiments, the detecting means is arranged to detect a change in the reactive power characteristic, and the control means is arranged to change the reactive power contribution to the electricity distribution network, in response to the detecting means detecting a transition of a value of the reactive power characteristic across a threshold value.

Preferably, the control means is arranged to:

change a value of the reactive power contributed to the electricity distribution network by the power device from a first predetermined value to a second predetermined value in response to a value of the detected reactive power component changing from a value less than a first threshold value to a value greater than the first threshold value; and change the reactive power contributed to the electricity distribution network by the power device from the second predetermined value to the first predetermined value in response to a value of the reactive power component changing from a value greater than a second threshold value to a value less than the second threshold value, the second threshold value having a magnitude less than the first threshold value.

This provides a hysteresis in the provision of reactive power to the electricity distribution network, preventing oscillations occurring in the functioning of the device, and disrupting current flow in the electricity distribution network.

Preferably, the control means is arranged to change the reactive power in response to a predetermined time period elapsing after the detecting means detects the change in the reactive power characteristic. This also prevents oscillations from being introduced into the electricity flow in the system.

In some embodiments, the electricity flowing in the electricity distribution network comprises an alternating current electricity flow having a predetermined period, and the control means is arranged to control a switching means to selectively interrupt provision of power to the power device during one or more portions of the predetermined period. In some embodiments, the control means comprises a current modulation means, such as pulse width modulation means, and the power characteristic comprises a duty cycle characteristic of the power of the power consumption device.

In some embodiments, the power device comprises a power provision device for providing electric power to the electricity distribution network, the power provision device is arranged to provide a direct current, and the control means is arranged to control a direct current to alternating current conversion means.

The reactive power control device may comprise means for detecting one or more electricity quality characteristic of electricity flowing in the electricity distribution network, and the control means is arranged to control a characteristic of power provided and/or consumed by the power device so as to alter said detected electricity quality characteristic, wherein the detected one or more electricity quality characteristic comprising at least one of; harmonics in the electricity flow; random or repetitive variations in voltage; network imbalance; oscillations in power flow; transients in the power flow. Thus, embodiments of the present invention may be used to correct anomalies in an electricity distribution network other than reactive power characteristics.

The power provision device for providing electric power to the electricity distribution network, the power provision device may comprise at least one of: a photovoltaic generation device, a personal electric vehicle, a personal electric bicycle and a domestic renewable energy source such as a CHP power generation device. The power device may comprise a power provision device arranged to provide a power to the electricity distribution network of typically up to approximately 10 kW, as the state of the art allows.

In some embodiments, the electricity distribution network comprises a transmission grid and a distribution grid, the transmission grid being connected to the distribution grid via one or more transformers and providing electric power thereto, and the distribution grid providing power to a plurality of domestic and/or industrial users, wherein the power device is for consuming power from, or providing power to, said distribution grid. Thus, embodiments of the present invention may be used in a transmission grid, for example in a local or city network. This enables a corrective contribution to be made to local reactive power flows in such networks.

In some embodiments, the reactive power control device comprises a communications interface for receiving an activation signal from a control centre, and the control means is arranged to perform the control of reactive power contribution in response to receipt of the activation signal at the communications interface. This enables a central entity to activate and/or deactivate of one or more reactive power control devices; this may be useful in applications of the present invention where groups of reactive power devices are used to provide reactive power compensation on an on-demand basis, for example as part of a scheme in which reactive power is sold to an electric power provider.

In accordance with a second aspect of the present invention, there is provided a system for use in controlling reactive power flow in an electricity distribution network, the system comprising a distributed plurality of reactive power control devices as described above, each controlling a respective power device connected to the electricity distribution network. Embodiments of the present invention may be implemented with distributed groups of power supply devices arranged to collectively provide compensatory reactive power compensation to the electricity distribution network.

The system may also comprise a control centre for sending the activation signal to each of the distributed plurality of reactive power control devices.

In preferred embodiments, different ones of the plurality of reactive power control devices are arranged to initiate performance of the control at different intervals after receiving the activation signal. This prevents all of the plurality of devices from activating simultaneously, causing a sudden change in electricity power flow in the electricity distribution network.

In some embodiments, the reactive power control devices comprises means for monitoring one or more performance characteristics of a respective power device, and for each device being arranged to transmit data indicative of the one or more performance characteristic to the control centre, the one or more performance characteristic comprising at least one of: a value of a detected reactive power component flowing in the electricity distribution network, an amount of reactive power provided to the electricity distribution network by a respective power device and times of performance of the control of provision of reactive power.

Additionally, or alternatively, the reactive power control devices may comprise means for measuring an electricity quality characteristic of electricity flowing in the electricity distribution network, and each of the reactive power control devices is arranged to transmit data indicative of the one or more electricity quality characteristic, the one or more electricity quality characteristic comprising at least one of: a reactive power characteristic harmonics in the electricity flow; random or repetitive variations in voltage; network imbalance; oscillations in power flow; and transients in the power flow.

This enables the control centre to obtain data relating to measurements made at various distributed points throughout the electricity distribution network; such data may be valuable for a power provider in monitoring network conditions, for example.

In accordance with a third aspect of the present invention, there is provided a method for use in controlling reactive power flow in an electricity distribution network connected to one or more power devices, the one or more power devices being arranged to consume power from, and/or provide power to, the electricity distribution network, the method comprising:

detecting, at the power device, a reactive power characteristic of electrical power flowing in the electric power distribution network, the reactive power characteristic relating to a reactive power component of electricity flowing in the electricity distribution network; and controlling, on the basis of the detected reactive power characteristic, a contribution of reactive power to the electricity distribution network by the power device, so as to adjust a value of the detected reactive power characteristic.

Further features and advantages of the invention will become apparent from the following description of preferred embodiments of the invention, given by way of example only, which is made with reference to the accompanying drawings.

DETAILED DESCRIPTION OF THE INVENTION

Figure 2:
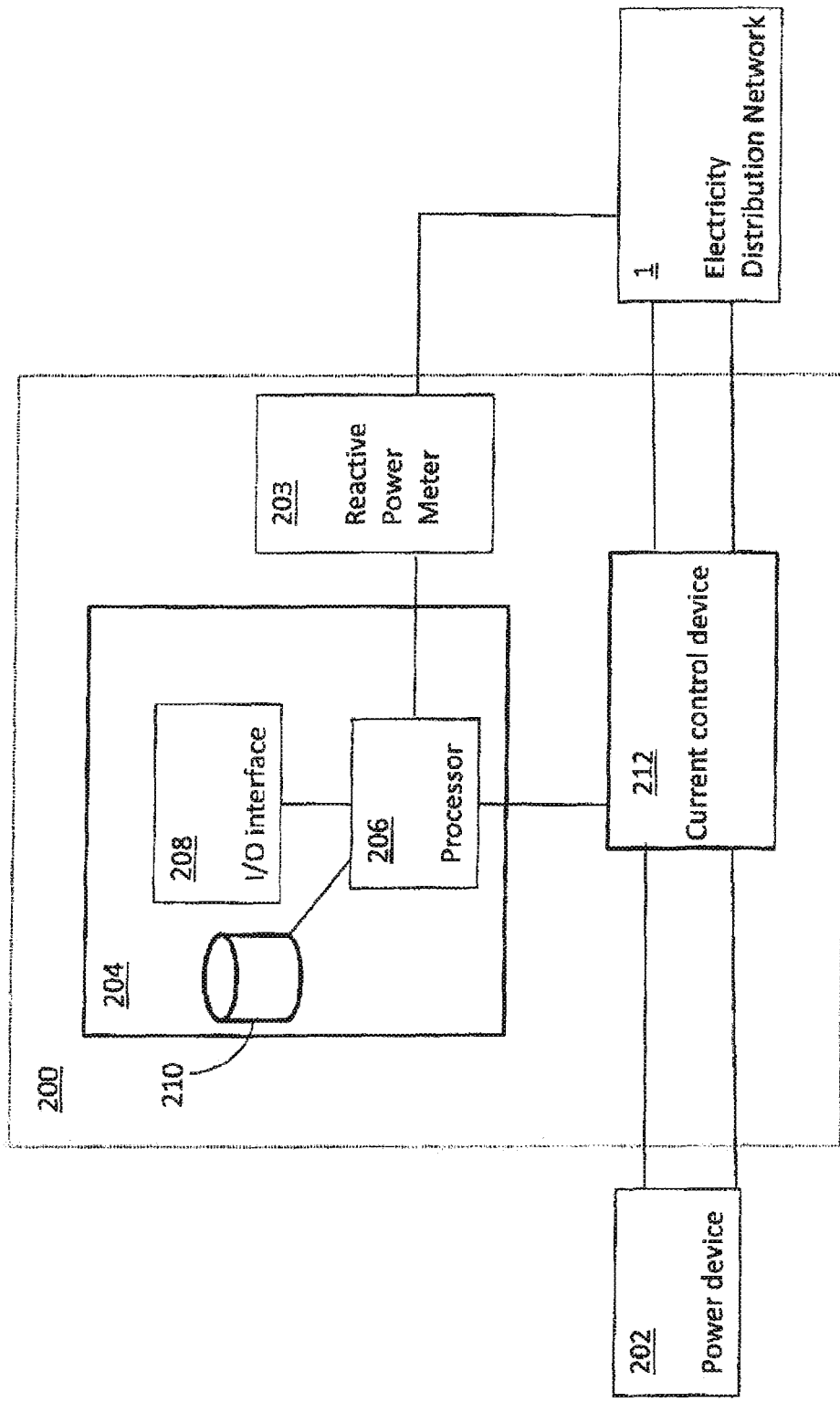
FIG. 2 shows a reactive power control device, a power consumption and/or provision device, an electricity distribution network and connections therebetween, in accordance with an embodiment of the present invention.

FIG. 2 shows a reactive power control device 200 for use in controlling a phase difference between the current and the voltage of electricity flowing in an electricity distribution network 1 at the location of a power device 202. The power device 202 may be a consumption device, for example, a low power consumption device, having a power rating of less than 500 W, such as an energy saving lamp, a mobile telephone charger, computing device supply, a medium sized power device, having a power rating of between 500 W and 10 kW, such as a personal electric vehicle (PEV), or a large power device, having a power rating of more than 10 kW, such as industrial machinery located at a factory. It should be noted that the devices may be single-phase or multi-phase; in the latter case the above power ratings apply per phase.

When the power device 202 comprises a power consumption device power is supplied to the power device 202 from the electricity distribution network 1, typically in the form of an alternating current, such as a sinusoidal alternating current.

The power device 202 may alternatively or additionally comprise a power provision device that provides power to the electricity distribution network 1. The power provision devices may comprise a power generation device that generates power using, for example, photovoltaic cells, or it may comprise a device that simply stores energy and releases it when required. Some devices may function both as a power consumption device and a power provision device; for example, personal electric vehicles (PEV) typically have the capacity to store a large amount of electricity. This means that, in addition to being consumers of power, they can be used as a source of power for the network at times of high demand, with electricity stored in the battery of the PEV being fed back to the network at such times.

Figure 1:
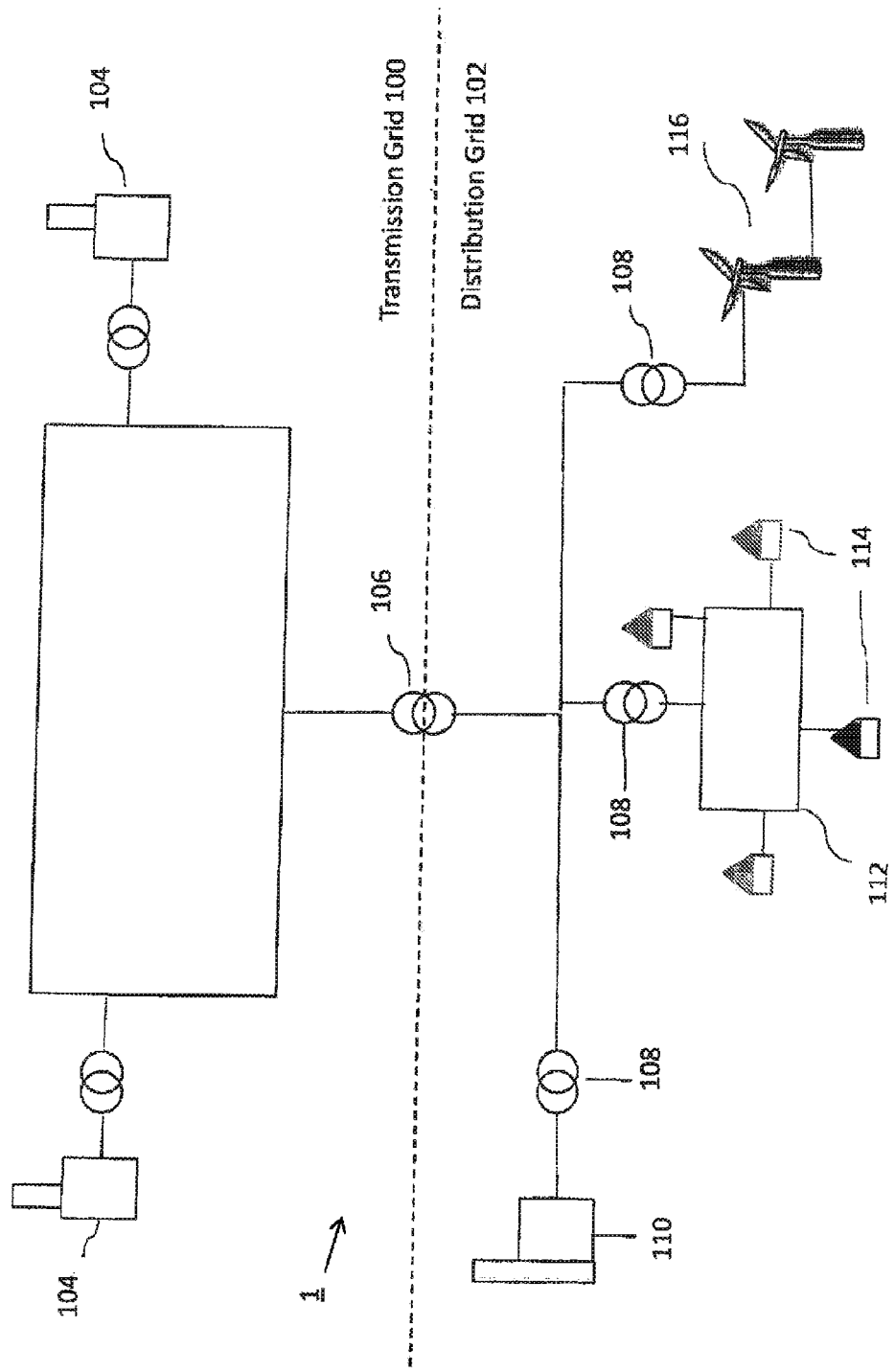
FIG. 1 shows a prior art electricity distribution network.

In embodiments of the present invention, the power device 200 is typically connected to the distribution grid 102 part of the electricity distribution network 1 described above with reference to FIG. 1, for example to a local network such as a city network.

The reactive power control device 200 may be implemented as an integral part of the power device 202 or a peripheral device thereof; for example, it may be implemented as part of an AC/DC converter for a mobile telephone charger or PEV. In other arrangements the reactive power control device may be implemented as a stand-alone device, which can be connected to the electricity distribution network 202, and to which power devices 202 can be interchangeably connected so that the power device receives power from, and/or provides power to, the electricity distribution network 202 via the reactive power control device 200.

The exemplary reactive power control device 200 shown in FIG. 2 comprises a reactive power meter 203, a control unit 204, and a current control device 212. The reactive power meter 203 detects and measures a reactive power characteristic (RPC) relating to a reactive power component of power flowing in the electricity distribution network 1 at the location of the power device 202. The reactive power meter 203 may comprise a phase detector which is commonly found in phase locked loop (PLL) circuits, a voltmeter and ammeter combination, and a clock, which measure voltage and current of electricity in the electricity distribution network 1 at the location of the power device 202, and timing characteristics thereof, or any other device capable of measuring a reactive power characteristic of the electricity flowing in the electricity distribution network. The reactive power meter 203 sends measurement signals to the control unit 204 indicative of RPCs it detects. The measurement signals may include data indicative of the magnitude and/or sign (i.e. whether the current lags or leads the voltage) of a reactive power component.

Many of the following examples are described with reference to a detected phase difference; however, in some embodiments a different RPC may be detected and used to determine a mode of the reactive power control device 200, for example, a magnitude of the reactive power component, or a power factor of the electricity flow. Further, where it is described herein that the reactive power meter 203 "measures" or "detects" a RPC, this should be understood to include cases where the reactive power meter 203 provides data to the control unit 204 from which the latter may derive the RPC; for example, the reactive power meter 203 may provide the control unit with data indicative of timings of peak voltage and peak current of alternative power flowing the electricity distribution network 1, from which the control unit 204 may derive a phase difference.

The control unit 204 comprises a processor 206, a data store 210 and a communications interface 208. The processor 206, which may be implemented as, for example, a programmable device or using simple logic circuitry, receives the measurement signals sent by the reactive power meter 203, and, based on these signals, determines a current-voltage phase shift of electricity flowing in the network and sends control signals to the current control device 212. The data store 210 may be used to record data such as data indicative of measurements made by the reactive power meter 203, control signals sent by the processor 206 to the current control device 212, and so on. The I/O interface 208 may be used to communicate with a control centre to provide it with data recorded in the data store and/or receive activation and/or deactivation signals from the control centre; the control centre and its interactions with the reactive power control devices will be described in more detail below.

The current control device 212 receives control signals from the processor 206 and, based on these signals, controls current flow to and or from the power device 202 such that the power device 202 contributes a reactive power flow to the electricity distribution network 1, the reactive power flow contribution from the power device 202 being selected as either a capacitive or an inductive power flow so as to drive the current-voltage phase difference towards a set optimum value, as discussed below.

Exemplary operations of the current control device 212 are now described with reference to FIGS. 3a to 3d, which show a variation of voltage with time at the power device 202. For clarity, the power device 202 in these examples is assumed to be a power consumption device and is referred to as such; however, it will be understood that the examples provided apply equally, mutatis mutandis, to power provision devices.

The shaded areas of FIGS. 3a to 3d represent periods of time when the current control device 212 controls the power consumption device 202 to draw current from the electricity distribution network 1; the unshaded areas represent periods of time when the current control device 212 controls the power consumption device 202 to draw no current from the electricity distribution network 1. This control may be performed by operating a switching device, typically a semiconductor switching device, to selectively connect and disconnect the power consumption device 202 to and from the electricity distribution network 1. In this way, the reactive power control device 200 can vary the duty cycle of the power consumption device 202 such that the power consumption 202 device consumes power asymmetrically over a given cycle, thereby adjusting the amount of reactive power it provides to the electricity distribution network 1, as is now described in more detail. By modulating the current provided to the power consumption device, the reactive power contribution of the power consumption device 202 can be varied without using any additional means of generating reactive power, such as switched capacitors. Further, the current modulation method enables a faster response to changes in network conditions than is possible with these additional means.

Figure 3A:
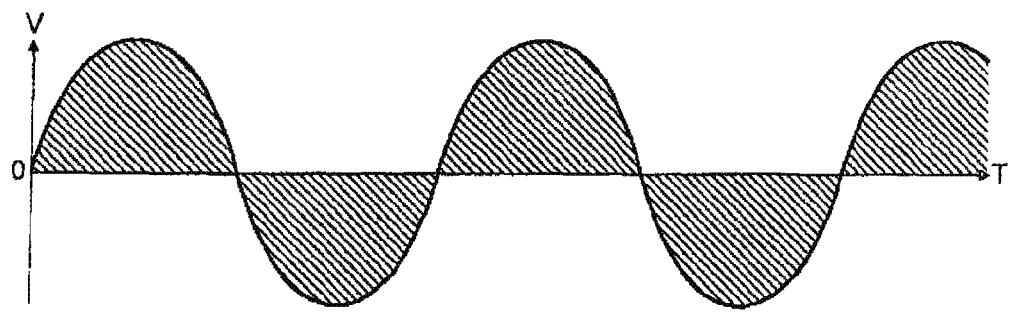
FIG. 3a shows power consumption cycles of a power consumption device.

In a first mode of operation of the reactive power control device 200 shown in FIG. 3a), the power consumption device 202 draws current from the electricity distribution network 1 over the whole of the voltage cycle. In this mode, the current control device 212 does not exert any influence on the power consumption device 202 i.e. the switch referred to above is in an "on" position for the whole of the voltage cycle. In this mode of operation, the current control device 212 has no effect on the current-voltage phase difference in the network. This mode of operation is referred to herein as a "neutral mode".

Figure 3B:
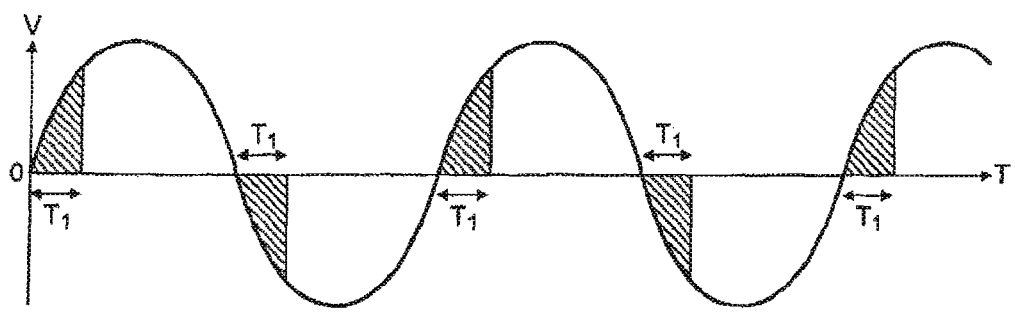
FIG. 3b shows a first type of controlled power consumption of power by a power consumption device in accordance with an embodiment of the present invention.

In a second mode of operation shown in FIG. 3b), the reactive power control device 200 controls the power consumption device 202 to draw current only for a time period T1 after each time the voltage at the device 202 crosses zero. This results in a current component which varies according to the same frequency as the voltage, but which leads it i.e. the reactive power control device 212 controls the power consumption device 202 to provide a capacitive reactive power to the electricity distribution network; conventionally, the phase difference is assigned a positive value where the current leads the voltage. Following this convention, in this mode of operation, the reactive power control device 200 controls the power consumption device 202 to generate a positive contribution to the current-voltage phase difference of electricity flowing in the electricity distribution network 1. Modes of operation in which the power consumption device 202 provides a positive contribution to the current-voltage phase difference are collectively referred to herein as a "capacitive mode".

Figure 3C:
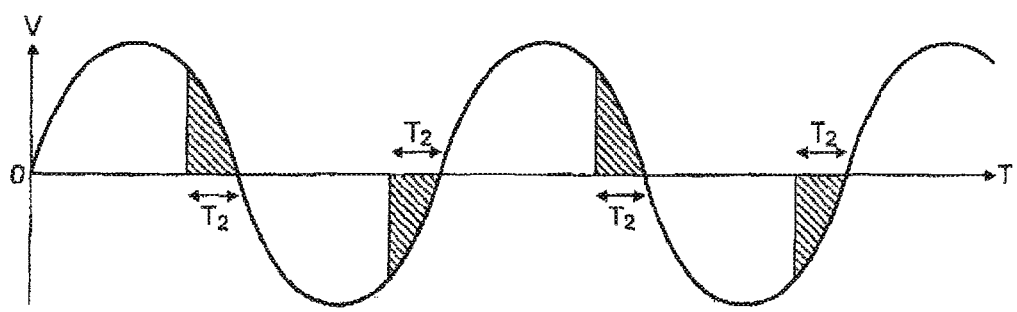
FIG. 3c shows a second type of controlled power consumption of power by a power consumption device in accordance with an embodiment of the present invention.

In a third mode of operation shown in FIG. 3c), the current control device 212 controls the power consumption device 202 to draw current only for a time period T2 before each time the voltage crosses zero; the length of time period T2 may be the same as or different to that of time period T1. This results in a current component which varies according to the same frequency as the voltage, but which lags it i.e. the current control device 212 controls the power consumption device 202 to provide an inductive contribution to power flow in the network. Following the above-described convention, in this mode of operation, the reactive power control device 200 controls the power consumption of the power consumption device 202 to produce a negative contribution to the current-voltage phase difference of electricity flowing in the electricity distribution network 1. Modes of operation in which the power consumption device 202 provides a negative contribution to the current-voltage phase difference are collectively referred to herein as an "inductive mode".

Figure 3D:
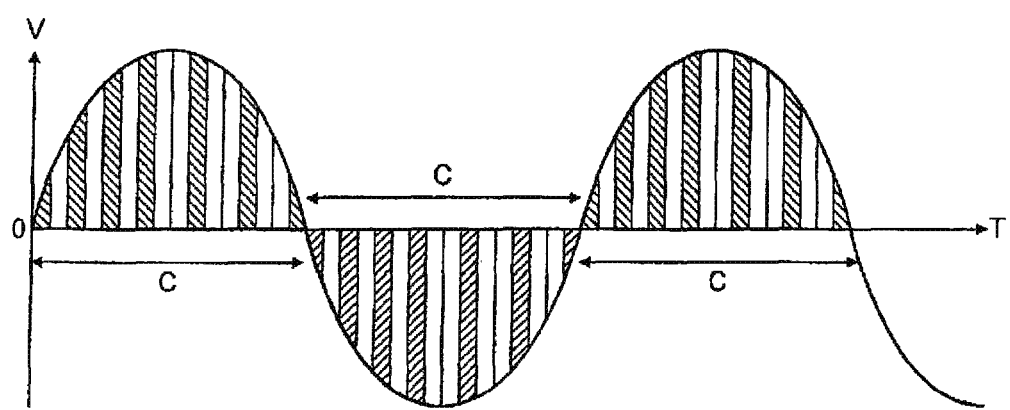
FIG. 3d shows a third type of controlled power consumption of power by a power consumption device in accordance with an embodiment of the present invention.

Although FIGS. 3a) to 3c) show three modes of operation of the current control device 212, in some embodiments of the present invention, the reactive power control device 200 has a different number of modes. For example, it may have different modes in which the values of T1 and/or T2 are varied so as to produce a greater or smaller reactive contribution from the power consumption device 202. It may additionally or alternatively have one or more modes of operation in which the voltage cycle is divided into many time slots, with current being drawn from selected ones of the slots in order to adjust the reactive contribution of the power consumption device 202. An example of such a mode of operation is shown in FIG. 3d), in which each half cycle C is divided into 16 time slots, with power being drawn from selected ones of the time slots; although only 16 slots are shown, for ease of understanding, typically each half-cycle C will be divided into many hundreds or thousands of slots, which enables a smoother distribution of power consumption over the voltage cycle. In the examples shown in FIG. 3d), power is supplied to the power consumption device during every other time slot in the early part of each half-cycle C, with power being supplied only every third time slot during the later part of each half cycle C, resulting in a capacitive reactive power contribution to the electricity distribution network.

In some embodiments of the present invention, the current control device 212 comprises a Pulse-Width Modulation (PWM) unit, and operates according to a PWM method, as is now described. In a PWM method, each cycle of the power supply from the electricity distribution network 1 is again divided into slots, for example a few tens of slots, with the proportion of time during each slot that power is supplied to the power consumption device 212 being varied according to the slots position in the cycle; for example, the power consumption device 202 could be run at 45% of capacity during the first and third quarters of each cycle, and at 55% during the second and fourth quarters to produce a "lagging" inductive power contribution. This may be implemented by dividing each of the time slots into sub-slots and supplying power to the power consumption device only during a proportion of the sub-slots of a given slot, for example.

As mentioned above, although the above examples described in relation to FIGS. 2 and 3 refer to the power device 202 as a power consumption device, in some embodiments of the present invention the power device 202 is a power provision device which provides power to the electricity distribution network 1, with provision of power rather than the consumption thereof being controlled by the reactive power control device 200. In the latter case, an alternating current provided by the power device 202 is modified in accordance with the above-described principles. This method is particularly suitable when the current provided by power device 202 is in AC form, or is converted to an AC form before being processed as described above.

However, in cases where the power device 202 provides a DC current, for example if the power device is a solar panel or electricity storage device, such as a PEV or personal electric bicycle battery, it may be convenient to modulate the current as part of a DC to AC conversion process. Further, in cases where AC power provided by the power device 202 is variable or of low quality, for example in a domestic biofuel generator, it may be convenient to convert the AC power to a stable DC power before re-converting it to an AC power according to a method as is now described. The AC/DC conversion may be implemented using a temporary or intermittent energy store such as a battery.

Figure 4:
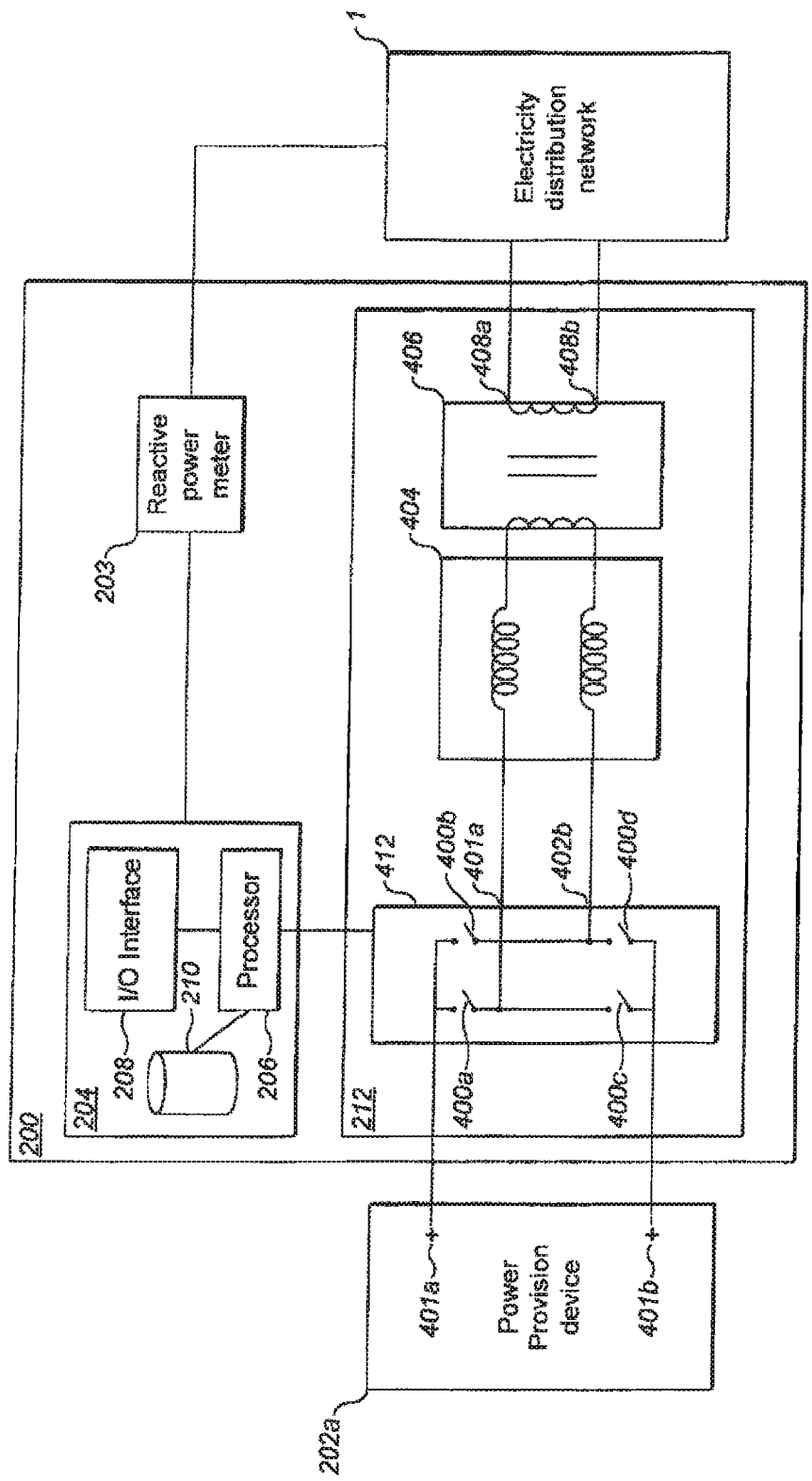
FIG. 4 shows a reactive power control device, a power provision device, an electricity distribution network and connections therebetween, in accordance with an embodiment of the present invention.

FIG. 4 shows details of a reactive power control device 200 that may be used as part of a (DC/AC) conversion device (often referred to as an "inverter"), as is described below. In this example, the reactive power control device 200 is used with a DC power provision device 202a, and the current control device 212 comprises an H-bridge 412, an inductor 404 and a transformer 406, functions of which are described below.

The DC supply from a DC power provision device 202a is connected to an H-bridge 412, which comprises four switches 400a to 400d, which are typically implemented as transistor or other semiconductor switches. The H-bridge 412 is controlled by the reactive power control unit 204 to control a reactive power contribution of the DC power provision device 202a. The H-bridge is connected via terminals 402a and 402b to an inductor 404 and subsequent components, which are described below.

By altering the configuration of the switches 400 of the H-bridge 412, it is possible to alter the polarity of the terminals 402a and 402b of the H-bridge 412. In a configuration in which diagonally opposing switches 400a and 400d are open and switches 400b and 400c are closed, H-bridge terminal 402a is electrically negative (i.e. current flows through terminal 402a towards the negative terminal 401a of the power provision device 202b), whilst H-bridge terminal 402b is electrically positive (i.e. current flows through terminal 402b of the H-bridge 412 away from the positive terminal 401a of the power provision device 410b). Conversely, in a configuration in which switches 400a and 400d are open and switches 400b and 400c are closed, H-bridge terminal 402a is electrically positive and H-bridge terminal 402b is electrically negative.

The processor 206 of the control unit 204 controls the switching configurations of the H-bridge so as to produce an AC signal from terminals 402a and 402b. The signal from the H-bridge 412 is fed to an inductor 404, which smoothes the AC signal, and from there to a transformer 406, which adjusts the signal to have voltage suitable for transmission in the electricity distribution network 1, to which the signal from the transformer 406 is fed.

Figure 5A:
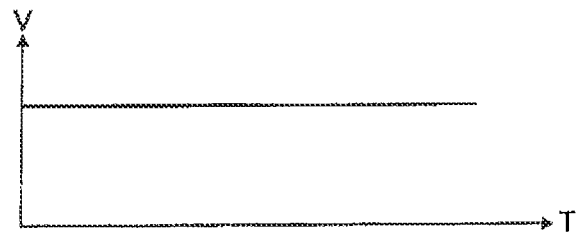
FIG. 5a is a graph showing voltage versus time at the output of a DC power provision device.

FIG. 5a is a graph of potential difference (V) between output terminals 401a and 401b of the power provision device 202b, against time (T). The potential difference is shown as non-varying; in practice, there may be some variation with time, according to, for example, weather conditions, if the power provision device 202a is a solar power generator.

Figure 5B:
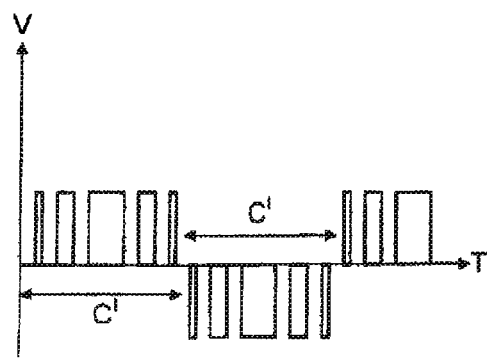
FIG. 5b is a graph showing the variation of voltage with time at terminals of an H-bridge controlled by a reactive power control device operating in a first mode in accordance with an embodiment of the present invention.
Figure 5E:
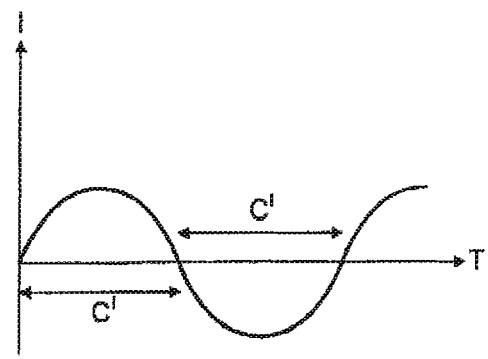
FIG. 5e is a graph showing the variation of current with time of current provided to an electricity distribution network by a power provision device controlled by a reactive power control device operating in the first mode in accordance with an embodiment of the present invention.
Figure 5C:
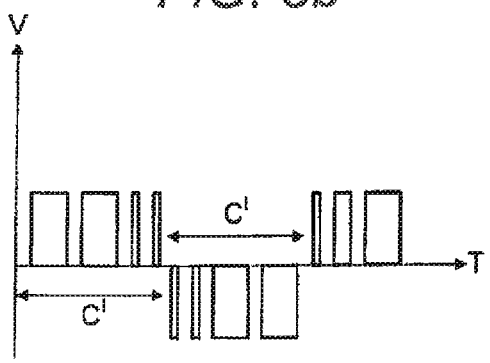
FIG. 5c is a graph showing the variation of voltage with time at terminals of an H-bridge controlled by a reactive power control device operating in a second mode in accordance with an embodiment of the present invention.
Figure 5F:
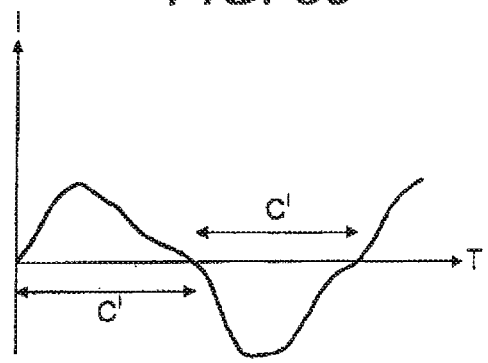
FIG. 5f is a graph showing the variation of current with time of current provided to an electricity distribution network by a power provision device controlled by a reactive power control device operating in the second mode in accordance with an embodiment of the present invention.
Figure 5D:
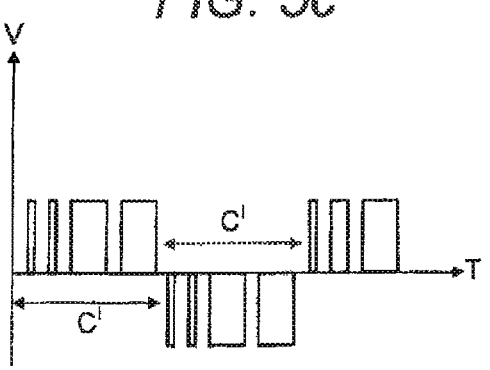
FIG. 5d is a graph showing the variation of voltage with time at terminals of an H-bridge controlled by a reactive power control device operating in a third mode in accordance with an embodiment of the present invention.
Figure 5G:
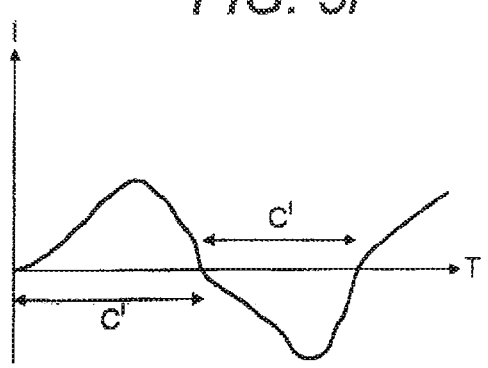
FIG. 5g is a graph showing the variation of current with time of current provided to an electricity distribution network by a power provision device controlled by a reactive power control device operating in the second mode in accordance with an embodiment of the present invention.

FIGS. 5b to 5d are graphs showing a potential difference between H-bridge terminals 402a and 402b against time, when the H-bridge 412 is being controlled in different modes according to embodiments of the present invention. FIGS. 5e to 5g show a corresponding variation of current (I) with time at the output terminals 408a and 408b of the transformer 406, i.e. the current supplied to the electricity distribution network 1. In each of the examples described with reference to FIGS. 5b to 5d, the control unit 204 controls the H-bridge 412 such that the switches 400a to 400d operate in a periodically repeating on-off sequence to produce an alternating current at the output terminals 408a and 408b of the transformer. The alternating current produced is arranged to be in phase with, and have a half-cycle C' length corresponding to that of the electricity flowing in the electricity distribution network 1.

FIG. 5b shows the variation of voltage against time at the H-bridge terminals 402a and 402b when the control unit 204 is controlling the H-bridge 412 according to a neutral mode of operation. In this mode of operation, the control unit 204 controls the switches 400 of the H-bridge 412 in a repeating on-off sequence, which is symmetric about the centre point of each half-cycle C', such that the current supplied to the electricity distribution network 1 is a symmetrical sinusoidal alternating current, as shown in FIG. 5e. Since the on-off pattern, and the current provided to the electricity distribution network is symmetric about the centre point of each half cycle C', no reactive power contribution is made to the electricity flowing in the electricity distribution network.

FIG. 5c shows the variation of voltage against time at the H-bridge terminals 402a and 402b when the control unit 204 is controlling the H-bridge according to a capacitive mode of operation. In this mode of operation, the control unit 204 controls the switches 400 of the H-bridge 412 in a repeating on-off sequence which is asymmetric about the centre point of each half-cycle, such that the current supplied to the electricity distribution network 1 is an asymmetric alternating current, as shown in FIG. 5f. The proportion of time during which current flows through the H-bridge 412 is higher during the first half of each half-cycle C', such that the current supplied to the electricity distribution network leads the voltage of electricity flowing therein; in this mode, a capacitive contribution is therefore made to the electricity flowing in the electricity distribution network 1.

FIG. 5d shows the variation of voltage against time at the H-bridge terminals 402a and 402b when the control unit 204 is controlling the H-bridge according to an inductive mode of operation. In this mode of operation, the control unit 204 controls the switches 400 of the H-bridge 412 in a repeating on-off sequence which is asymmetric about the centre point of each half-cycle, such that the current supplied to the electricity distribution network 1 is an asymmetric alternating current, as shown in FIG. 5g. The proportion of time during which current flows through the H-bridge 412 is higher during the second half of each half-cycle C', such that the current supplied to the electricity distribution network lags the voltage of electricity flowing therein; in this mode, an inductive contribution is therefore made to the electricity flowing in the electricity distribution network 1.

The embodiments described with reference to FIG. 4 and FIGS. 5a to 5g provide a further method of modulating current flow from a power provision device 202 to vary the reactive power contribution of the power provision device 202 can be varied without using any additional means of generating reactive power, such as switched capacitors. In the embodiments described, a reactive power contribution is controlled by producing an AC signal which is asymmetric about the centre point of each half-cycle C', but which crosses the zero point at the same frequency at, and at the same timing of, the voltage signal flowing in the electricity distribution network 1. Additionally or alternatively, a reactive power contribution may be produced by shifting the timing at which the signal crosses the zero point, so as to be out of phase with the voltage signal flowing in the electricity distribution network 1.

In the above examples, the reactive power control device operates in a finite number of discrete modes, in which the 212 provides reactive power of a predefined magnitude in each of the modes. In some cases, there are regulations prescribing a maximum allowable power factor that may be provided by a power consumption device 202. For example, European Community regulations prescribe that devices having a power rating of up to 25 W must have a power factor of 0.5 or more, and that devices having a power rating of 75 W or greater must have a power factor of 0.9 or more (see IEC/EN 61000-3-2). Accordingly, it may be advantageous for the current control device 212 to be arranged to provide the maximum allowable output in all cases that the measured current control device 212 is active. However, in some embodiments, the current control device 212 may be arranged to vary the Magnitude of the reactive power provided continuously in accordance with the measured value of the current-voltage phase difference.

The number and type of modes of operation may be chosen according to characteristics, such as the power rating, of the power device 202 and/or regulations prescribing a maximum allowed reactive power contribution. Further, the current control device 212 is not limited to the examples described; for example, a device, which could include a variable resistance, could be used which provides some proportion of the total available current at any given point in the current cycle, in conjunction with or as an alternative to the switching devices described above.

By controlling the power consumption of the power consumption device 202 according to the modes of operation of the reactive power control device 200 described above, a capacitive reactive power contribution and/or an inductive reactive power contribution to the power flow in the electricity distribution network 1 can be provided which is independent of any inductive and/or capacitive reactance that the components of the power device 202 may themselves possess. Thus, although the power unit 202 may make, for example, an inductive contribution to the power flow, due to inductive components therein, such as magnet coils etc., the contribution to the power flow due to the operation of the reactive power control device 200 may be, for example, capacitive.

Figure 6:
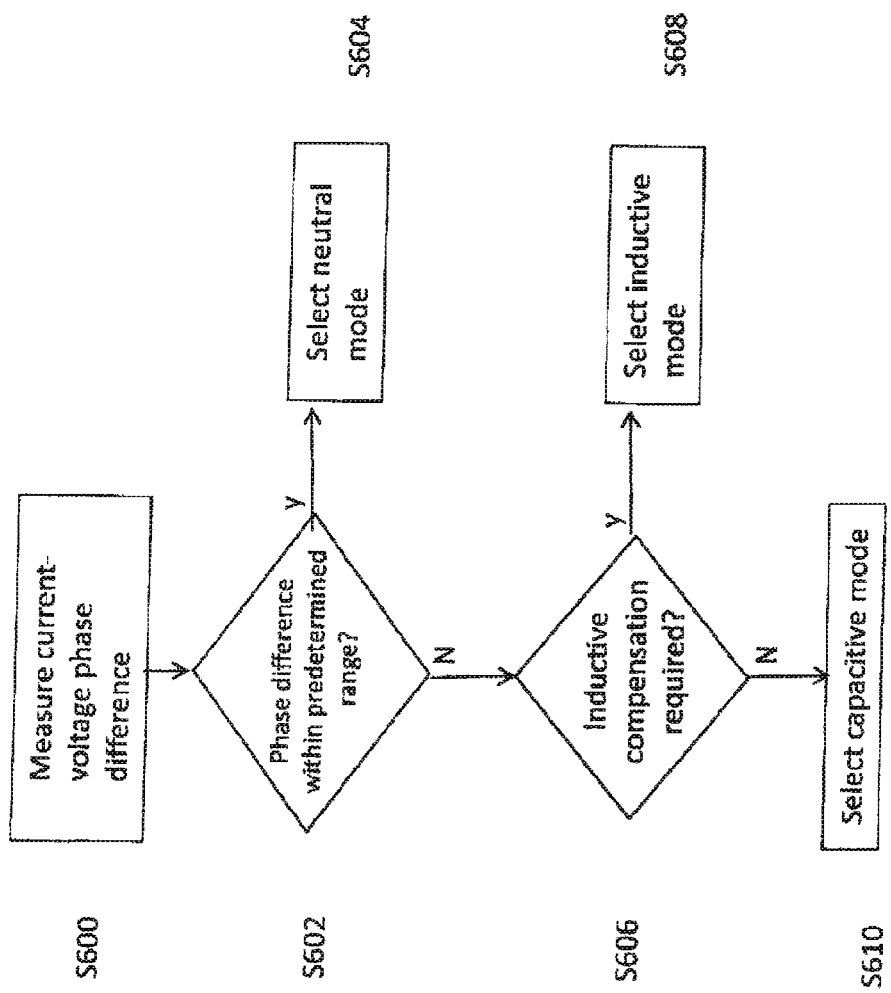
FIG. 6 is a flow diagram showing steps performed by a reactive power control device when controlling a power consumption and/or provision device in accordance with an embodiment of the present invention.

FIG. 6 is a flow diagram showing exemplary steps performed by the reactive power control device 204 in controlling the power device 202 in accordance with some embodiments of the present invention. At step S600 the reactive power meter 203 measures a current-voltage phase difference of electricity flowing in the electricity distribution network at the location of the power device 202.

At step S602, the processor 206 in the control unit 202 determines, based on the measurement made at step S600 whether the phase difference is within a predetermined range, which may be a predetermined range of the phase differences, within which the phase difference does not require adjustment. If the processor 206 determines that the phase difference is within the predetermined range, no adjustment to the reactive contribution of the power device 202 is required, so the process proceeds to step S604 in which the processor 206 selects a neutral mode of the reactive power control device 200, and sends a command signal to the current control device 212 to operate in the selected neutral mode.

If, on the other hand, the processor determines at step S602 that the phase difference is not within the predetermined range, the process proceeds to step S606 where the processor 206 determines whether inductive compensation is required, for example by determining whether the phase difference measured at step S600 is outside of the predetermined range on the inductive side. If it determines that an inductive contribution is required, the process proceeds to step S608, in which the processor selects a capacitive mode, so that the current control device 212 controls the power device 202 to provide an inductive contribution to power flow in the electricity distribution network 1, and sends a command signal to the current control device 212 to operate in a capacitive mode.

If it is determined at step S606 that inductive compensation to the phase difference is not required, it is concluded that a capacitive contribution is required, and the process proceeds to step S610 in which the processor 206 selects an inductive mode, so that the current control device 212 controls the power device 202 to provide an inductive contribution to power flow in the electricity distribution network, and sends a command signal to the current control device to operate in an inductive mode.

In this way the reactive power control device 200 controls the flow of current, and thereby power, to and/or from the power device 202 in response to a locally detected current-voltage phase difference of electricity flowing in the electricity distribution network 1. This control of current flow produces a reactive power contribution which adjusts the phase difference of the electricity flowing in the electricity distribution network. In cases where the power consumption and/or provision of the power device 202 is large, the corrective reactive power contribution from an individual device may provide a significant adjustment to the phase difference of electricity flowing in the electricity distribution network. Further, even where the power consumption and/or provision of individual power devices 202 is small, for example if the device is a low power device as described above, the combined contribution from a distributed group of such devices can have a significant effect on current-voltage phase difference of electricity flowing in the electricity distribution network, as is described in more detail below.

Typically, the conditions of the network will vary with time; accordingly, in some embodiments of the present invention, the process described above with reference to FIG. 6 is repeated continuously, or at intervals, with changes in the phase difference detected by the reactive power meter resulting in different modes, and thereby different reactive power contributions being selected.

In the above example, it was described that the reactive power compensation device 200 determines whether the phase difference is within a predetermined range and selects a mode of operation in dependence on this determination; however, in some embodiments, there is no predetermined range. In these embodiments, the reactive power compensation device 200 omits step S602, and proceeds directly to step S606. In other words, in these embodiments, there is no "neutral mode" of operation of the reactive power compensation device, and the reactive power compensation device 200 switches between capacitive and inductive modes depending on whether the reactive power flow is determined to be more inductive or more capacitive than a predefined value.

In some cases it is desirable to provide a reactive power component having a sign which always opposes the sign of the detected reactive power component (i.e. to provide a capacitive component if the detected reactive power component is inductive, and vice versa), so that the predefined value mentioned above is zero; in other cases, the optimum current-voltage phase difference may be a non-zero value. This is because the current-voltage phase difference may vary as it travels through the electricity distribution network 1, due to reactive contributions from transformers and other components in the electricity distribution network 1. The optimum situation from the perspective of efficiency of power transmission is therefore not necessarily for the phase difference to be zero at the location of the power device 202; it may instead be for the phase difference to, for example, slightly capacitive (e.g. in the range 2 to 5 degrees) at the power device 202, so that, if the phase difference is slightly inductive at a power station, it will be zero at some point in the middle of the network. Accordingly, the reactive power compensation device 200 may be arranged to determine a value of the phase difference, compare this with a predefined optimum value, and provide a reactive power contribution aimed at reducing the difference between the detected phase difference and the predefined value.

Since the predetermined range mentioned above is typically centred on (or at least includes) the optimum value, in some cases, especially where the optimum value is set at or near to zero and/or where the predetermined range mentioned above is relatively large, the end points of the range may be of opposite sign i.e. one end may correspond to a capacitive value, with the other end corresponding to an inductive value. In these cases, the step of determining whether inductive compensation described above (step S606) may comprise simply determining whether the current-voltage phase difference measured at step S600 is inductive or whether it is reactive. In other cases, where the optimum value is set at a non-zero value, and especially where the predetermined range is relatively narrow, the predetermined range will comprise only capacitive values or only inductive values. In these cases, step S606 may comprise comparing the phase difference measured with at step S600 with the end points of the predetermined range to determine whether the measured phase difference lies on the inductive side or the capacitive side of the range.

In some cases there may be small fluctuations in the phase shift of electricity in the electricity distribution network 1; if these fluctuations occur at or near the threshold values defining the end points of the acceptable range described above, they can cause the reactive power control device 200 to oscillate between modes; this may exacerbate the oscillations, and produce instability in the current flowing in the electricity distribution network 1. In order to reduce or eliminate these oscillations, a hysteresis may be used in relation to the threshold values at which the reactive power control device 200 switches between modes, as is now explained with reference to FIG. 5.

Figure 7:
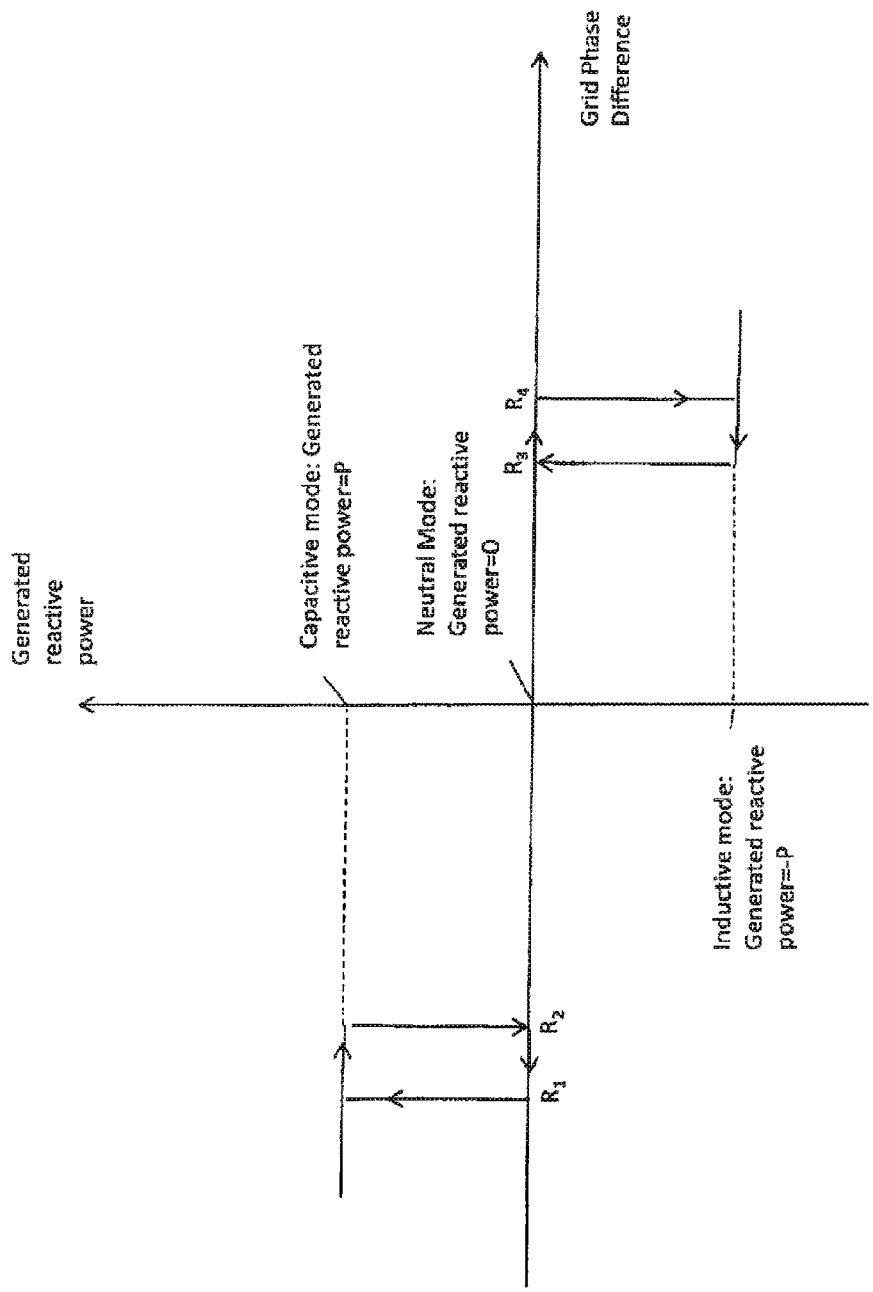
FIG. 7 is a graph showing measured network reactive power versus generated reactive power at a power consumption and/or provision device in accordance with an embodiment of the present invention.

FIG. 7 is a graph showing the measured network phase difference versus the generated reactive power of the power device 202. In the example shown, the power device 202 generates a reactive power of +P when operating in mode 2, zero reactive power when operating in mode 1, and a reactive power of −P when operating in mode 3. Although the magnitude of the reactive power generated in this example is the same in both mode 2 and mode 3, in some embodiments the magnitude may be different in each of the modes.

FIG. 7 shows four threshold values, $R_1$ to $R_4$ at which the reactive power control device 200 switches between modes, with $R_1$ and $R_2$ representing negative (inductive) phase differences ($|R_1|<|R_2|$) and $R_3$ and $R_4$ representing positive (capacitive) phase differences ($|R_4|<|R_3|$). As the magnitude of an inductive network phase difference increases, the reactive power control device switches from a neutral mode to capacitive mode once the value of the phase difference crosses $R_1$. However, in the opposite direction, as the magnitude of an inductive network phase difference decreases, the reactive power control device 200 does not switch from a capacitive mode to a neutral mode at $R_1$; instead it switches at $R_2$. Similarly, for an increasing capacitive network phase difference, the reactive power control device 200 switches from a neutral mode to an inductive mode, but for a decreasing capacitive network phase difference, it switches at $R_4$. Thus, even if the phase difference does fluctuate around one of the threshold values $R_1$ to $R_4$, there is no oscillation in the mode of operation of the reactive power control device 200, because the latter is stable in a neutral mode around $R_2$ and $R_3$, stable in a capacitive mode around $R_1$ and stable in an inductive mode around $R_4$.

The example described above in relation to FIG. 7 refers to $R_1$ and $R_2$ as representing inductive values and $R_3$ and $R_4$ as representing capacitive values; however, it will be understood that where the optimum value mentioned above is non-zero, all of $R_1$ to $R_4$ may be capacitive or they may all be inductive. In this case, the reactive power control device 200 may switch to a capacitive mode to provide a capacitive contribution when the detected phase difference crosses $R_1$, even if the detected phase difference remains capacitive; similarly, the reactive power control device 200 may switch to an inductive mode to provide an inductive contribution when the detected phase difference crosses $R_4$ even if the detected phase difference remains inductive.

Additionally, or alternatively, to the hysteresis feature described, the reactive power control device may be arranged to delay the switch between modes when crossing a threshold value for some predetermined time period T3. This also prevents high frequency oscillations from being introduced into the system.

Furthermore, as mentioned above, in some embodiments of the present invention, a plurality of reactive power control devices 200 may be distributed at different locations in the electricity distribution network, each of the reactive power control devices 200 controlling a respective power device 202, thereby forming a system which can be used to control reactive power flow in the electricity distribution network 1. This may be particularly advantageous when used with low or medium sized power devices 202, enabling a more significant adjustment to reactive power flow in the electricity distribution network than can be achieved by using individual devices. For example, it is estimated that around 5% of all power consumption is due to lighting devices at commercial and domestic premises. If all such lighting devices used a reactive power control device 200 according to the present invention, and assuming that the methods described herein allow 5% of total power usage of a power consumption device to be contributed as reactive power (a figure which is easily achievable using the methods described herein), 0.25% of total network power capacity could be used to provide more efficient reactive power characteristics In embodiments using distributed groups of reactive power control devices 202 (though not limited to these embodiments), one or more of the values of the threshold values $R_1$ to $R_4$ at which the reactive power control devices 200 switch between modes, and/or the length of the delay in switching T3, may be varied between different devices. The values may be assigned randomly (for example within defined limits around defined optimum values) during manufacture of the reactive power control device 200, and stored in the data store 210. In some cases, the processor 206 of the reactive power control device 200 may vary one or more of values $R_1$ to $R_4$ and T3; this could be done according to a randomisation process implemented at predefined time limits, or on activation of the device by an activation signal from a control centre (see below), for example. Randomising these values in this way prevents distributed groups of devices from acting in concert to produce unwanted oscillations in the system.

As mentioned above, the reactive power control devices 200 may be arranged to communicate with a control centre via the communications interface. The control centre may be a node in the electricity distribution network, or any other device arranged to communicate and/or control a distributed group of reactive power control devices as described herein.

Communication between it and the reactive power control device 200 could be performed using wireless or fixed line communications, for example, communication via the internet and/or a GSM network. In some cases communications between the reactive power control device 200 and the control centre may take place by transmission of data along the power lines 414.

In same embodiments of the present invention, the reactive power control device 200 may be arranged to receive an activation signal from the control centre and control the reactive power provided to the electricity distribution network 1 in response to receipt of the activation signal i.e. the activation signal turns the reactive power control device 200 on, with the latter being inactive i.e. turned off prior to receiving the activation signal. When the reactive power control device is inactive, the power device 202 may consume and/or provide power provided by the electricity distribution network in accordance with its normal operation i.e. as though it were not connected to the reactive power control device 200. The control centre may also provide deactivation signals to turn the reactive power control device off i.e. into an inactive state.

On receipt of an activation signal from the control centre, each of a distributed group of the reactive power control devices 200 turns on and begins operating according to, for example, the process described above in relation to FIG. 6. The generation of random values in relation to the parameters $R_1$ to $R_4$ and/or T3 described above may be performed in response to receipt of this activation signal. It may also be advantageous to arrange the system so that the reactive power control devices 200 activating in response to the activation signal do not all activate at the same time, in order to prevent sudden changes in reactive power flowing in the electricity distribution network. This may be done by arranging each device to activate after a randomly generated time interval has elapsed after receiving the activation signal; this randomly generated time interval may be generated by the devices themselves, or it may be prescribed in the activation signal itself.

In some embodiments, the parameters $R_1$ to $R_4$ and/or T3 may be prescribed by the control centre, as part of activation signal, or some other signal. This enables the characteristics of the reactive power control devices 202 to be tailored according to the specific conditions of the electricity distribution network 1.

In some embodiments some of the reactive power control devices 200 behave autonomously, without the control of a control centre, and some other reactive power control devices 200 acting under the control of a control centre. In this case, it may be advantageous for the predetermined range described above to be relatively large for the autonomous reactive power control devices 202, and relatively narrow for the remotely controlled devices 202; in this way, all reactive power control devices 202 react to large swings in reactive power in the electricity distribution networks, but with only remotely controlled devices, which may be more finely adjusted by adjusting their characteristics remotely, being used to adjust smaller changes.

As described, using a control centre to activate and/or deactivate the reactive power control devices 200 enables the latter to be used to deliver reactive power on demand to the electricity distribution network 1. Thus, groups of users of the reactive power control devices 200 and/or an operator of the control centre may sell reactive power to the power provider, for example.

The reactive power control devices 200 may also communicate with the control centre to provide data regarding the performance of the reactive power control device, and other information. For example, the processor 206 may be arranged to record data in the data store 210, such as activation times of the reactive power control device 200, amounts of reactive power provided to the electricity distribution network 1, results of measurements of RPC by the reactive power meter 203 etc., and to provide this information to the control centre via the communications interface 208. If the power device 202 is a mobile device, such as a PEV, it may also be arranged to record its location, using e.g. a GPS tracking device, and communicate the same to the control centre.

Further, the reactive power control devices 200 may measure one or more characteristic of the electricity flowing in the electricity distribution network 1, and to communicate data indicative of these electricity characteristics to the control centre. This measurement may be performed using the reactive power meter 203, or one or more other meters. The one or more electricity quality characteristic measured and reported may include one or more of the following:

A reactive power characteristic;
Voltage variations such as dips, sags, swells and brown-outs, in which the line voltage is higher or lower than the nominal voltage for a short period of time; this may be caused by e.g. network faults, switching of capacitive loads and excessive loading;
Harmonics; variations in the line voltage at multiples of the supply frequency; this may be caused by e.g. power electronic loads such as variable speed drives and UPS systems;
Flicker; random or repetitive variations in the voltage; this may be caused by e.g. mills, EAF operation (arc furnaces), welding equipment and shredders;
Network unbalance i.e. different line voltages; this may be caused by single-phase loads, phase to phase loads and unbalanced three-phase loads like welding equipment;
Oscillations (resonances): the flow of electrical energy, e.g. between the magnetic field of an inductor and the electric field of a capacitor, changes direction periodically;
Transients (fast disturbances): rapid change in the sine wave that occurs in both voltage and current waveforms; this may be caused by switching devices, start- and stop of high power equipment.

The reactive power control devices 202 may also include means to control the power consumption and/or provision of the power device 202 to provide an adjustment to these detected quality characteristics, using an adaptation of the methods described above in relation to FIGS. 2 to 7, for example.

The control centre may use this information for example to determine areas of the electricity distribution network 1 requiring reactive power compensation. The control centre may then determine a required amount of reactive power required to be generated by a distributed group of the reactive power control devices 200, and specify a group of the devices in the relevant network area and send an activation signal to each of the specified devices. To this end, it may be convenient for the reactive power control devices 200 to each be individually addressed; for example, each reactive power control device 200 may have an IP address and/or each reactive power control device may be fitted with a subscriber identity module SIM card, in which case the address data comprises an identity number of the SIM card, such as an MSISDN number.

The techniques and methods described herein may be implemented by various means. For example, these techniques may be implemented in hardware (one or more devices), firmware (one or more devices), software (one or more modules), or combinations thereof. For a hardware implementation, the devices of FIGS. 2 and 4 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a data store unit and executed by processors. The data store unit 210 may be implemented within the processor or externally to the processor. In the latter case it can be communicatively coupled to the processor via various means, as is known in the art. Additionally, the components of the systems described herein may be rearranged and/or complemented by additional components in order to facilitate the achieving of the various aspects, etc., described with regard thereto, and they are not limited to the precise configurations set forth in the given figures, as will be appreciated by one skilled in the art.

The above embodiments are to be understood as illustrative examples of the invention. Further embodiments of the invention are envisaged. For example, in the embodiments discussed above, the electricity distribution network 1 uses a single phase distribution. However, it will be clear to the skilled person that the same principles apply to multi-phase systems, such as three-phase systems.

Further, in the above examples, the current control device 212 is implemented using one or more semiconductor switching devices. Such embodiments may be particularly suitable for use with domestic consumption devices drawing a current of up to approximately 25 to 35 amps as is allowed in the art. However, when used with a high power consumption or provision device, which produce a level of current which may damage the semiconductor switches, it may be preferable to use other switching devices, such as vacuum tubes.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A reactive power control device for use with a power device, the power device being for consuming power from, or providing power to, an electricity distribution network when connected thereto, the reactive power control device comprising:
    a detector for detecting, at a location of the power device, a reactive power characteristic of electrical power flowing in the electric power distribution network;
    a processor configured to determine whether said reactive power characteristic of electricity flowing in said electricity distribution network is more inductive than a first predefined value or whether it is more capacitive than a second predefined value; and
    a controller configured to:
        control said power device to change, in response to a determination that said reactive power characteristic is more inductive than the first predefined value, a reactive power contribution of the power device to the reactive power flowing in the electricity distribution network from a first contribution value to a second contribution value, the second contribution value being more capacitive than the first contribution value; and
        control said power device to change, in response to a determination that said reactive power characteristic is more capacitive than the second predefined value, a reactive power contribution of the power device to the reactive power flowing in the electricity distribution network from a third contribution value to a fourth contribution value, the fourth contribution value being more inductive than the third contribution value.

2. The reactive power control device of claim 1, wherein the first predefined value and the second predefined value are the same.

3. The reactive power control device of claim 1, wherein the first contribution value and the third contribution value are the same.

4. The reactive power control device of claim 1, wherein said reactive power characteristic relates to a phase difference between voltage and current of electricity flowing in the electricity distribution network, the first predefined value comprises a predefined phase difference value, and the second predefined value comprises a predefined phase difference value.

5. The reactive power control device of claim 1, wherein the first predefined value is more inductive than the second predefined value.

6. The reactive power control device of claim 1, wherein the first contribution value and the second contribution value are both inductive, the second contribution value being less inductive than the first contribution value.

7. The reactive power control device of claim 1, wherein the third contribution value and the fourth contribution value are both capacitive, the fourth contribution value being less capacitive than the third contribution value.

8. The reactive power control device claim 1, wherein said controller is configured to change said reactive power contribution in response to a predetermined time period elapsing after said processor determines said reactive power characteristic of electricity flowing in said electricity distribution network is more inductive than the first predefined value or more capacitive than the second predefined value.

9. The reactive power control device claim 1, wherein the electricity flowing in the electricity distribution network comprises an alternating current electricity flow having a predetermined period, and the controller is configured to control a switch to selectively interrupt provision of power to and/or from the power device during one or more portions of the predetermined period.

10. The reactive power control device of claim 1, wherein the controller comprises a current modulator.

11. The reactive power control device of claim 10, wherein the controller comprises a pulse width modulator, the power device comprises a power consumption device for consuming power from the electricity distribution network, and the controller is configured to control a duty cycle characteristic of the power consumption of the power consumption device.

12. The reactive power control device of claim 1, wherein the power device comprises a power provision device for providing electric power to the electricity distribution network, the power provision device being configured to provide a direct current, and the controller is configured to control a direct current to alternating current converter.

13. The reactive power control device of claim 1, further comprising a quality characteristic detector for detecting one or more electricity quality characteristics of electricity flowing in the electricity distribution network, wherein said controller is configured to control a characteristic of power provided and/or consumed by the power device so as to alter said detected electricity quality characteristic, the detected one or more electricity quality characteristic comprising at least one of; harmonics in the electricity flow; random or repetitive variations in voltage; network imbalance; oscillations in power flow; transients in the power flow.

14. The reactive power control device of claim 1, wherein the power device comprises a power provision device for providing electric power to the electricity distribution network, the power provision device comprising at least one of: a photovoltaic generation device, a personal electric vehicle, a personal electric bicycle and a domestic renewable energy source.

15. The reactive power control device of claim 1, wherein the electricity distribution network comprises a transmission grid and a distribution grid, the transmission grid being connected to the distribution grid via one or more transformers and providing electric power thereto, and the distribution grid providing power to a plurality of domestic and/or industrial users, wherein the power device is for consuming power from, or providing power to, said distribution grid.

16. The reactive power control device of claim 1, comprising a communications interface for receiving an activation signal from a control center, wherein said controller is configured to perform said control of said reactive power contribution of the power device to the reactive power flowing in the electricity distribution network in response to receipt of said activation signal at said communications interface.

17. A system for use in controlling reactive power flow in an electricity distribution network, the system comprising:
a distributed plurality of reactive power control devices, each controlling a respective power device connected to the electricity distribution network, wherein each of the distributed plurality of reactive power control devices comprises:
a detector for detecting, at a location of the power device, a reactive power characteristic of electrical power flowing in the electric power distribution network;
a processor configured to determine whether said reactive power characteristic of electricity flowing in said electricity distribution network is more inductive than a first predefined value or whether it is more capacitive than a second predefined value;
a controller configured to:
control said power device to change, in response to a determination that said reactive power characteristic is more inductive than the first predefined value, a reactive power contribution of the power device to the reactive power flowing in the electricity distribution network from a first contribution value to a second contribution value, the second contribution value being more capacitive than the first contribution value; and
control said power device to change, in response to a determination that said reactive power characteristic is more capacitive than the second predefined value, a reactive power contribution of the power device to the reactive power flowing in the electricity distribution network from a third contribution value to a fourth contribution value, the fourth contribution value being more inductive than the third contribution value; and
a communications interface for receiving an activation signal from a control center, wherein said controller is configured to perform said control of said reactive power contribution of the power device to the reactive power flowing in the electricity distribution network in response to receipt of said activation signal at said communications interface; and
a control center for sending an activation signal to each of the distributed plurality of reactive power control devices.

18. The system of claim 17, wherein different ones of the plurality of reactive power control devices are configured to initiate performance of said control at different intervals after receiving said activation signal.

19. A method for use in controlling reactive power flow in an electricity distribution network connected to one or more power devices, the one or more power devices being configured to consume power from, and/or provide power to, the electricity distribution network when connected thereto, the method comprising:
detecting, at a location of a said power device, a reactive power characteristic of electrical power flowing in the electricity distribution network;
determining whether said reactive power characteristic of electricity flowing in said electricity distribution network is more inductive than a first predefined value or whether it is more capacitive than a second predefined value;
controlling said power device to change, in response to a determination that said reactive power characteristic is more inductive than the first predefined value, a reactive power contribution of the power device to the reactive power flowing in the electricity distribution network from a first contribution value to a second contribution value, the second contribution value being more capacitive than the first contribution value; and
controlling said power device to change, in response to a determination that said reactive power characteristic is more capacitive than the second predefined value, a reactive power contribution of the power device to the reactive power flowing in the electricity distribution network from a third contribution value to a fourth contribution value, the fourth contribution value being more inductive than the third contribution value.

20. The method of claim 19, comprising:
generating a threshold value according to a random value generation process;
detecting a change in said reactive power characteristic; and
changing said reactive power contribution of the power device to the reactive power flowing in the electricity distribution network in response to a detected transition of a value of said reactive power characteristic across the threshold value.

21. The method of claim 20, comprising:
determining a time period value according to a random time period value generation process; and
changing said reactive power contribution of the power device to the reactive power flowing in the electricity distribution network in response to a predetermined time period elapsing after detecting said change in said reactive power characteristic.

22. A power device for consuming power from, or providing power to, an electricity distribution network when connected thereto, the power device comprising a reactive power control device, the reactive power control device comprising:
a detector for detecting, at a location of the power device, a reactive power characteristic, the reactive power characteristic being a characteristic of electrical power flowing in the electricity distribution network;

a processor configured to determine whether said reactive power characteristic of electricity flowing in said electricity distribution network is more inductive than a first predefined value or whether it is more capacitive than a second predefined value; and a controller configured to:

control the power device to change, in response to a determination that said reactive power characteristic is more inductive than the first predefined value, a reactive power contribution of the power device to the reactive power flowing in the electricity distribution network from a first contribution value to a second contribution value, the second contribution value being more capacitive than the first contribution value; and control the power device to change, in response to a determination that said reactive power characteristic is more capacitive than the second predefined value, a reactive power contribution of the power device to the reactive power flowing in the electricity distribution network from a third contribution value to a fourth contribution value, the fourth contribution value being more inductive than the third contribution value.

* * * * *